United States Patent
Nishimura

(10) Patent No.: US 9,712,380 B2
(45) Date of Patent: Jul. 18, 2017

(54) ANALYTICAL DEVICE CONTROL SYSTEM

(71) Applicant: SHIMADZU CORPORATION, Kyoto-shi, Kyoto (JP)

(72) Inventor: Hiroomi Nishimura, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 370 days.

(21) Appl. No.: 14/015,387

(22) Filed: Aug. 30, 2013

(65) Prior Publication Data
US 2015/0067141 A1    Mar. 5, 2015

(51) Int. Cl.
*G06F 15/16* (2006.01)
*H04L 12/24* (2006.01)
*H04L 29/08* (2006.01)

(52) U.S. Cl.
CPC .......... *H04L 41/0668* (2013.01); *H04L 67/10* (2013.01); *H04L 41/5096* (2013.01)

(58) Field of Classification Search
CPC ....................................................... H04L 43/04
See application file for complete search history.

(56) References Cited

U.S. PATENT DOCUMENTS

| 2007/0142936 A1* | 6/2007 | Denison et al. ................ 700/29 |
| 2009/0157757 A1 | 6/2009 | Yamamoto et al. |
| 2013/0061086 A1* | 3/2013 | Baba ................................ 714/3 |
| 2015/0019671 A1* | 1/2015 | Yasuda et al. ................ 709/208 |

FOREIGN PATENT DOCUMENTS

| JP | 2008-158934 A | 7/2008 |
| JP | 2010-067115 A | 3/2010 |
| WO | WO 2013145325 A1 * | 10/2013 ............. H04L 12/56 |

OTHER PUBLICATIONS

Communication dated Feb. 25, 2014 from the Japanese Patent Office in corresponding application No. 2011-071993.

* cited by examiner

*Primary Examiner* — Moustafa M Meky
*Assistant Examiner* — Sm Z Islam
(74) *Attorney, Agent, or Firm* — Sughrue Mion, PLLC

(57) ABSTRACT

Analytical device control servers transmit analytical parameter information and analysis data concerning the analysis being controlled to a system control server at a predetermined time interval. When the system control server detects a fault in an analytical device control server, the system control server determines a new assignment destination from among other normally functioning analytical device control servers, transmits analytical parameter information and analysis data saved in an analysis information storage unit to the assignment destination analytical device control server, and transmits a command to continue execution of control of analysis of the analytical device to that analytical device control server.

5 Claims, 2 Drawing Sheets

ANALYTICAL DEVICE CONTROL SYSTEM

TECHNICAL FIELD

Figure 1:
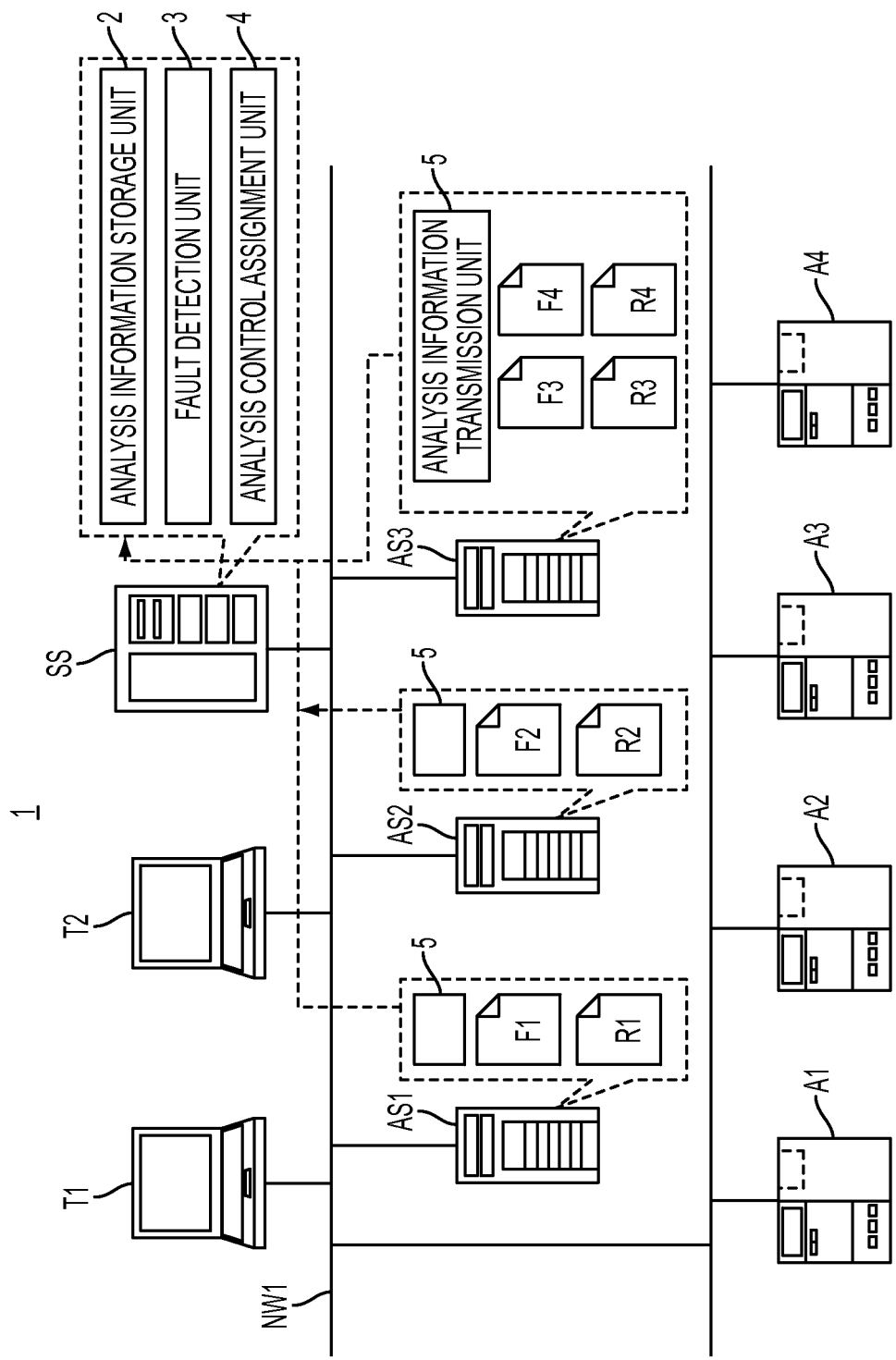

The present invention relates to a networked analytical device control system. More specifically, the present invention relates to a system which makes it possible to continue analysis even when a fault occurs in an analytical device control server in such a system.

It will be noted that analytical devices in the present invention including all forms of devices which measures physical magnitudes of a sample which is the object of measurement.

BACKGROUND ART

Analytical devices such as chromatographs, spectrophotometers and mass analyzers are commonly connected to an analytical device control server for controlling the analytical device and performing data collection.

Previously, an analytical device and an analytical device control server would generally be connected in one to one fashion using a cable such as RS-232C. However, this involves the problem of high costs due to the need to provide an analytical device control server for each analytical device and the inconvenience that the analyst needs to specially go to the location where the analytical device is installed to manipulate and control it.

In light of this situation, in recent years, systems have become common wherein a network communication module is incorporated into the analytical device, analytical device control server, etc., in order to perform monitoring and control of the analytical device from a remote terminal via a network.

In this sort of networked analytical device control system, in addition to the analytical devices (normally, multiple devices) and analytical device control server, a terminal computer for issuing analysis instructions and analyzing the results of analysis, a system control server for controlling the entire system, etc., are connected over a network, and various types of data are exchanged via the network.

In a networked analytical device control system, various types of devices are connected to each other, so if a problem occurs in one place in the system, there is a high likelihood that other analyses and data processing will be affected. Thus, it is important not just to configure the entire system so that problems will be unlikely to occur, but also to configure the system such that, in the event that a fault occurs, the fault can be detected and recovered from as quickly as possible.

An example of a system which allows rapid recovery from faults is the system described in Patent Literature 1. In this system, an analytical device control server transmits analytical parameter information pertaining to the settings of the analytical device at a set timing to a data management server, and the analytical parameter information is saved on the data management server. Based on this configuration, in the event that some sort of fault occurs in the analytical device control server and analytical parameter information is lost, the analytical parameter information saved on the data management server is transmitted to the analytical device control server once the fault is resolved, thereby allowing rapid fault recovery of the system as a whole.

(Patent literature 1) Japanese Unexamined Patent Application Publication 2008-158934

In conventional analytical device control systems, including the invention described in Patent Literature 1, analysis data, which is the result outputted from the analytical device when analysis is carried out, is held on the analytical device control server, and is transmitted from the analytical device control server to the data management server, etc. and saved whenever one or a predetermined number of analyses has been completed.

In this sort of system configuration, when a fault occurs in the analytical device control server during execution of analysis, update of analysis data information stored moment to moment in the analytical device control server may terminate mid-way or the analysis data itself may be lost. In such cases, even if the analytical device was functioning normally, the need arises to stop the operation of the analytical device and rerun the same analysis again. This entails the effort of reloading the sample and inputting an instruction to execute the analysis again, so there is the problem that losses occur in terms of time and costs. Furthermore, in cases where the quantity of sample is small or where the sample is valuable, situations may be envisioned where the act of rerunning an analysis under the same analytical parameters is itself problematic.

Based on the foregoing, a system is strongly desired which would allow the execution of an analysis to be continued without losing analysis data even if a fault occurs in the analytical device control server.

SUMMARY OF THE INVENTION

The analytical device control system according one aspect of the present invention, which was made to resolve the problem described above, is a networked analytical device control system wherein an analytical device, a plurality of analytical device control servers which have analytical parameter information which is data pertaining to the settings of said analytical device and perform control of said analytical device and data collection, and a system control server which manages the overall system are connected via a network, characterized in that said analytical device control servers have an analysis information transmission unit which transmits analytical parameter information for the analytical device which is the object of control and analysis data received moment to moment from said analytical device as analysis is performed to said system control server at predetermined time intervals; and said system control server has an analysis information storage unit which stores analytical parameter information and analysis data for said analytical device, which are transmitted from said analytical device control servers;

a fault detection unit which detects the occurrence of faults in the analytical device control servers; and an analysis control assignment unit which, based on the detection of the occurrence of a fault by said fault detection unit, determines an assignment destination from among the other normally functioning analytical device control servers, transmit the analytical parameter information and analysis data for said analytical device stored in said analysis information storage unit to the assignment destination analytical device control server, and transmit a command to continue execution of control of analysis of said analytical device to the assignment destination analytical device control server.

In the analytical device control system according to the aspect of the present invention, analytical parameter information and analysis data outputted moment to moment from the analytical device to the analytical device control servers are transmitted at predetermined time intervals by the analytical device control servers to the system control server. The analytical parameter information and analysis data are stored in the analysis information storage unit provided in the system control server. Furthermore, when it is detected that a fault has occurred in an analytical device control server, the system control server determines a new assignment destination from among the other normally functioning analytical device control servers, transmits the analytical parameter information and analysis data for the analytical device which was controlled by the analytical device control server in which the fault occurred to the assignment destination analytical device control server, and transmits a command to continue execution of control of analysis of the analytical device.

Consequently, even if a fault occurs in an analytical device control server, without interrupting the analysis being executed on the analytical device which was being controlled by that analytical device control server, it becomes possible to continue the analysis under control of another analytical device control server. Thus, there is the advantage that the effort and time of having to execute the analysis again can be avoided and the sample to be analyzed will not be wasted due to interruption of analysis. As a result, a system of higher reliability can be created.

BRIEF DESCRIPTION OF THE DRAWINGS (FIG. 1) is a drawing illustrating the simplified configuration of a mode of embodiment of an analytical device control system according to the present invention.

(FIG. 2) is a conceptual drawing showing the interruption processing during occurrence of fault in an analytical device control system according to a mode of embodiment of the present invention.

DETAILED DESCRIPTION OF THE EXEMPLARY EMBODIMENTS

An example of a mode of embodiment of the analytical device control system according to the present invention will be described in detail while referring to the drawings.

FIG. 1 is a drawing which shows the simplified configuration of a mode of embodiment of the analytical device control system according to the present invention. The analytical device control system 1 of the present mode of embodiment (which may abbreviated hereafter as "the present system") has a configuration as described below.

It will be noted that an analytical device in the present invention is any type of networked analytical device or measurement/assay device, the type thereof not being limited in any way. Furthermore, the types and number of the various devices connected to the system network NW1, such as devices, machines, servers, computers, etc., are in no way limited to what is indicated in the present mode of embodiment.

Client computers T1 and T2 which a user manipulates to input various instructions and check various types of information are connected to a system network NW1, such as a LAN. A system control server SS, which coordinates and controls the present system 1 as a whole is also connected to the system network NW1. Furthermore, although not illustrated, a data management server for managing or storing analysis completion data outputted as a result of completion of analysis is also connected to the system network NW1. It will be noted that this data management server may also be integral with the system control server SS.

Analytical device control servers AS1, AS2 and AS3 and analytical devices A1, A2, A3 and A4 are further connected to the system network NW1. Namely, client computers T1 and T2, system control server SS, analytical device control servers AS1, AS2 and AS3 and analytical devices A1, A2, A3 and A4 are all connected to the system network NW1 so as to allow communication among them.

It will be noted that the network format in the present invention is not limited hereto and can be of any sort so long as the analytical device control servers, analytical devices and system control server are connected such that, in the event that a fault occurs in a given analytical device control server, communication will be possible among the remaining ones.

Client computers T1 and T2, system control server SS and analytical device control servers AS1 through AS3 are all computers comprising a CPU, memory, and a storage unit comprising a hard disc, flash memory or the like.

Among these, a program for the system control server SS is preinstalled in the storage unit of the system control server SS, and the CPU executes this program to implement the fault detection unit 3 and analysis control assignment unit 4 in software. Furthermore, an analysis information storage unit 2 is provided in a portion of the storage unit of the system control server SS.

Furthermore, an analytical device control server program is preinstalled in the storage unit of analytical device control servers AS1, AS2 and AS3, and the CPU executes this program to implement the analysis information transmission unit 5 in software.

Analytical parameter information F1, F2, F3 and F4 pertaining to the analyses to be executed in analytical devices A1 through A4 respectively is further stored in the storage units of analytical device control servers AS1 through AS3. Analytical parameter information includes various data pertaining to analytical device settings, including the following, for example.

Batch file indicating the content of batch analysis
Method file indicating the parameters (analytical device settings, computation method for acquired data, etc.) for each analysis
Progress status file indicating the progress status of analysis
Environment settings file indicating the condition, etc. of the connected analytical device
Results file for recording the feasibility of each analysis, used for assessment of batch analysis, etc.

The analytical parameter information F1 through F4 stored in the analytical device control servers is partially or fully updated by being rewritten by various commands issued through user manipulation via client computers T1 and T2, or by being automatically rewritten by commands from the analysis device.

The analytical device control servers AS1 through AS3 further store analysis data R1, R2, R3 and R4, which are the accumulation of data transmitted moment to moment (i.e. at predetermined time intervals, etc.) from each analytical device as the result of the analysis executed in the respective analytical devices A1 through A4.

Figure 2:
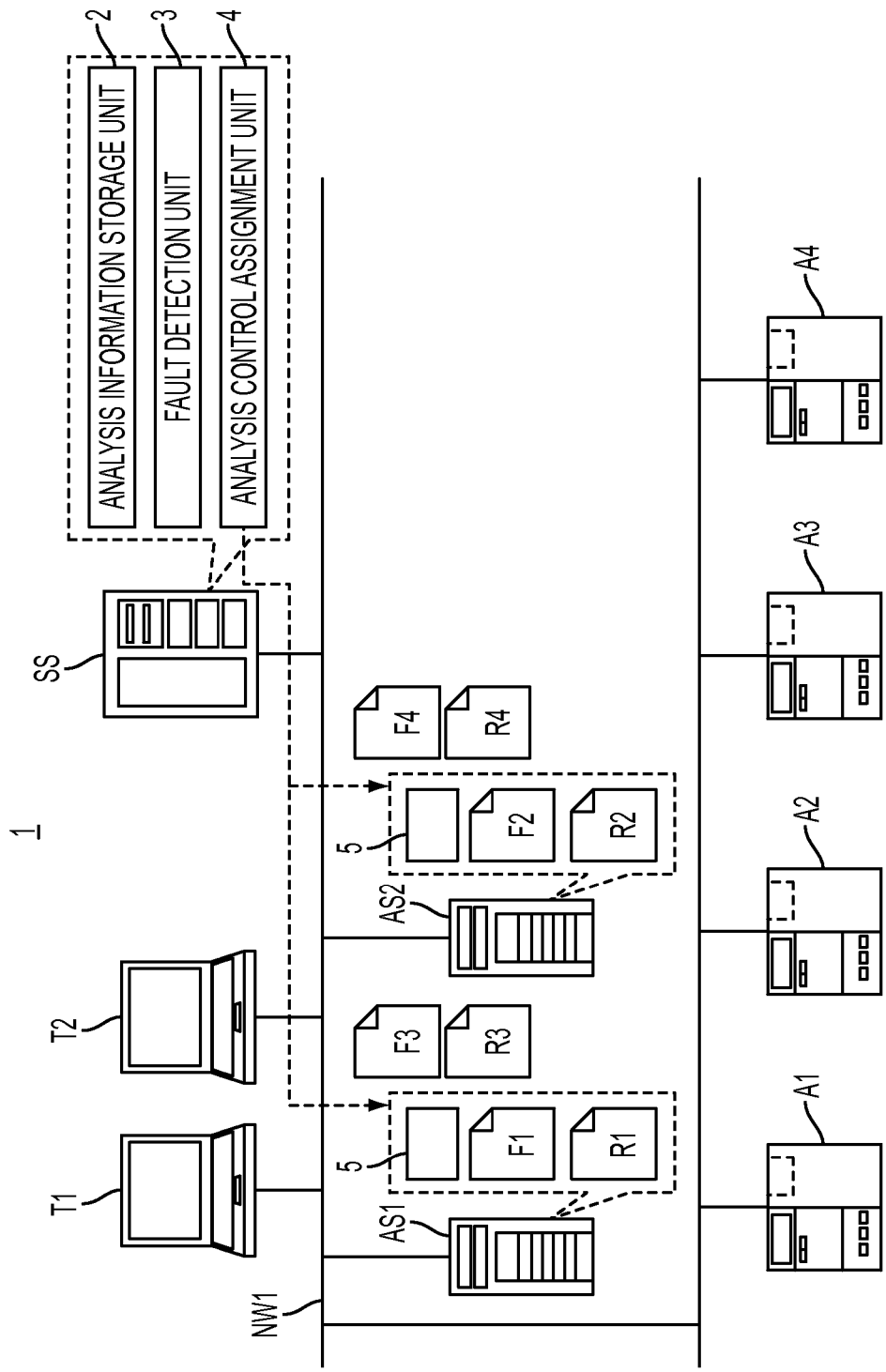

The processing when newly initiating analysis in the present system 1 will be described below while referring to FIG. 2. FIG. 2 is a conceptual diagram illustrating the processing when initiating analysis in the analytical device control system in a mode of embodiment of the present invention.

First, it will be assumed that currently, analytical device A1 is executing analysis under the control of analytical device control server AS1, analytical device A2 is executing analysis under the control of analytical device control server AS2, and analytical devices A3 and A4 are executing analysis under the control of analytical device control server AS3.

Here, analysis information transmission unit 5 of analytical device control server AS1 transmits analytical parameter information F1 and analysis data R1 at predetermined time intervals to system control server SS. Similarly, analytical device control servers AS2 and AS3 transmit analytical parameter information F2, F3, F4 and analysis data R2, R3, R4 at predetermined time intervals to system control server SS.

The system control server SS stores the analytical parameter information F1 through F3 and analysis data R1 through R3 transmitted from analytical device control servers AS1 through AS3 in analytical parameter information storage 2 for each analysis. As a result, analytical parameter information F1 through F4 and analysis data R1 through R4 pertaining to analysis devices A1 through A4 are stored not just in the respective analytical device control servers AS1 through AS3 but also in analysis information storage unit 2 of system control server SS.

It will be noted that the time interval at which the analysis information transmission unit 5 of analytical device control servers AS1 through AS3 transmits analytical parameter information and analysis data can be set for example to about several milliseconds to once per second. If the load on the system is not that large, a shorter time interval can be used. From the standpoint of increasing the identity between the analytical parameter information and analysis data possessed by analytical device control servers AS1 through AS3 and the analytical parameter information and analysis data stored in analysis data storage unit 2 of system control server SS, it is preferable for this time interval to be as short as possible. It will be noted that this time interval does not need to be always the same value, and may be varied according to the type of analysis and performance of each device.

The fault detection unit 3 of system control server SS monitors whether the analytical device control servers AS1, AS2 and AS3 are functioning normally while the analytical device control servers AS1, AS2 and AS3 are executing analysis, and detects the occurrence of faults. The method of detecting the occurrence of faults can be of any sort. For example, since analytical parameter information and analysis data are transmitted from the analytical device control servers at predetermined time intervals during execution of analysis, as described above, the fault detection unit 3 can determine that a fault has occurred if it was not able to receive analytical parameter information from an analytical device control server for a predetermined number of times (for example, 3 times) or for a predetermined period of time (for example, 2 seconds).

It will now be assumed that a fault has occurred in the analytical device control server AS3 which was controlling the analysis of analytical devices A3 and A4 (or in the communication with analytical device control server S3), as shown in FIG. 2. The fault detection unit 3 of system control server SS detects that a fault has occurred in analytical device control server AS3.

When the occurrence of a fault is detected by fault detection unit 3, the analysis control assignment unit 4 first performs the operation of determining the new assignment destination for analytical devices A3 and A4 which had been controlled by analytical device control server AS3 from among the other analytical device control servers which are functioning normally. The analytical device control assignment unit 4 maintains information such as the analysis schedule of each analytical device and what analytical devices each analytical device control server is controlling, and selects and determines the assignment destination analytical device control server so as not to impose an excessive load on the system 1 or the assignment destination analytical device control server through this assignment processing. In the present embodiment example, the analytical device control assignment unit 4 assigns the control of analytical device A3 to analytical device control server AS1 and the control of analytical device A4 to analytical device control server AS2.

The analytical device control assignment unit 4 furthermore transmits, to analytical device control server AS1, the analytical parameter information F3 and analysis data R3 pertaining to the analysis being executed on analysis device A3, which have been stored in analysis information storage unit 2, and also transmits a command to continue execution of control of analysis of analytical device A3. At the same time, it transmits, to analytical device control server AS2, the analytical parameter information F4 and analysis data R4 pertaining to the analysis being executed on analytical device A4, which have been stored in analysis information storage unit 2, and also transmits a command to continue execution of control of analysis of analytical device A4.

Furthermore, analytical device control server AS1, upon receiving the analytical parameter information F3 and analysis data R3 pertaining to the analysis being executed on analytical device A3 and the command to continue execution of control of analysis of analytical device A3, continues the execution of control of the analysis being executed on analytical device A3. Subsequently, the analysis information transmission unit 5 of analytical device control server AS2 transmits analytical parameter information F3 and analysis data R3 pertaining to the analysis being performed on analytical device A3 to the system control server SS. Analysis control device AS2 also performs the same processing for the newly assigned analysis device A4. In this way, even if a fault occurs in analytical device control server S1, the analyses being executed on analytical devices A3 and A4 continue to be controlled without stopping.

The analytical device control system according to the present invention was described above using an embodiment example, but it is clear that the foregoing is no more than an example, and changes, modifications or additions may be made at one's discretion within the gist of the present invention.

EXPLANATION OF REFERENCES

1 . . . Analytical device control system
2 . . . Analysis information storage unit
3 . . . Fault detection unit
4 . . . Analysis control assignment unit
5 . . . Analysis information transmission unit
NW1 . . . System network
A1 through A4 . . . Analysis device
AS1 through AS3 . . . Analytical device control server
SS . . . System control server

What is claimed is:
1. A networked analytical device control system, comprising:
 a plurality of analytical devices;
 a plurality of analytical device control servers which have analytical parameter information which is data pertaining to the settings of said plurality of analytical devices and perform control of said plurality of analytical devices and data collection, each of said plurality of analytical device control servers corresponding to a different subset of said plurality of analytical devices; and a system control server which manages said networked analytical device control system, wherein:

said plurality of analytical devices, said plurality of analytical device control servers, and said system control server are connected via a network, said analytical device control servers include an analysis information transmission unit which transmits analytical parameter information for the plurality of analytical devices which are the object of control, and analysis data received moment to moment from said plurality of analytical devices as analysis is performed, to said system control server at predetermined time intervals, and said system control server includes:

an analysis information storage unit which stores analytical parameter information and analysis data for said plurality of analytical devices, which are transmitted from said analytical device control servers;

a fault detection unit which detects the occurrence of faults in the analytical device control servers; and an analysis control assignment unit which, based on the detection of the occurrence of a fault by said fault detection unit in one of said plurality of analytical device control servers having a corresponding subset of said plurality of analytical devices, determines an assignment destination from among the other normally functioning analytical device control servers, transmits the analytical parameter information and analysis data for said corresponding subset of said plurality of analytical devices stored in said analysis information storage unit to the assignment destination analytical device control server, and transmits a command to continue execution of control of analysis of said corresponding subset of said plurality of analytical devices to the assignment destination analytical device control server.

2. The analytical device control system described in claim 1, wherein said fault detection unit determines that a fault has occurred if it has been unable to receive analytical parameter information from one of said plurality of analytical device control servers for a predetermined quantity of said time intervals or for a predetermined period of time.

3. The networked analytical device control system of claim 1, wherein prior to the detection of the occurrence of a fault by said fault detection unit, each analytical device of said plurality of analytical devices corresponds to a single analytical device control server.

4. The networked analytical device control system of claim 1, wherein said analytical parameter information comprises a progress status file indicating the progress status of an analysis.

5. The networked analytical device control system of claim 1, wherein said analytical parameter information comprises an environment settings file indicating a condition of a connected analytical device.

* * * * *